(12) United States Patent
Nishi

(10) Patent No.: US 7,024,344 B1
(45) Date of Patent: Apr. 4, 2006

(54) CALCULATION METHOD FOR PHYSICAL BODY DEFORMATION UNDER LOAD PROPAGATION

(75) Inventor: Yasukazu Nishi, Tokyo (JP)

(73) Assignee: Nihon University, Tokyo (JP)

( * ) Notice: Subject to any disclaimer, the term of this patent is extended or adjusted under 35 U.S.C. 154(b) by 923 days.

(21) Appl. No.: 09/856,179

(22) PCT Filed: Jul. 19, 2000

(86) PCT No.: PCT/JP00/04834

§ 371 (c)(1),
(2), (4) Date: Aug. 6, 2001

(87) PCT Pub. No.: WO01/52193

PCT Pub. Date: Jul. 19, 2001

(30) Foreign Application Priority Data

Jan. 12, 2000 (JP) .............................. 2000-003496

(51) Int. Cl.
*G06F 19/00* (2006.01)
*G06F 17/50* (2006.01)
*G06F 7/60* (2006.01)
*G06G 7/48* (2006.01)

(52) U.S. Cl. .................... 703/7; 703/2; 700/98; 716/20

(58) Field of Classification Search ................ 703/1, 703/2, 7; 700/98, 118; 716/20

See application file for complete search history.

(56) References Cited

U.S. PATENT DOCUMENTS

| | | | | |
|---|---|---|---|---|
| 5,424,634 A | * | 6/1995 | Goldfarb et al. | 324/158.1 |
| 5,936,869 A | * | 8/1999 | Sakaguchi et al. | 703/1 |
| 5,946,479 A | * | 8/1999 | Sakaguchi et al. | 716/20 |
| 6,535,211 B1 | * | 3/2003 | Hariya et al. | 345/423 |
| 6,643,628 B1 | * | 11/2003 | Jackson et al. | 706/25 |

OTHER PUBLICATIONS

Maurer, A. "Structural Analysis (Siemens) of the Euratom Coil for the Large Coil Task." IEEE Transactions on Magnetics. Sep. 1981. vol. 17, Issue 5, pp, pp. 2093-2096.*

Leifer, J. et al. "Finite Element Simulation of a Nondestructive Shear Test for TAB Bonds." IEEE Transactions on Semiconductor Manufacturing. Aug. 1995. vol. 8, Issue 3, pp. 352-359.*

Howard, D et al. "Evolution of Mesh Refinement Rules for Impact Dynamics." Proc. of the 2000 Congress on Evolutionary Computation. Jul. 19, 2000. vol. 2, pp. 1297-1303.*

(Continued)

*Primary Examiner*—Paul L. Rodriguez
*Assistant Examiner*—Ayal Sharon
(74) *Attorney, Agent, or Firm*—Oblon, Spivak, McClelland, Maier & Neustadt, P.C.

(57) ABSTRACT

Method for calculating a deformation of a physical body under a load by forming virtual first to n-th material agents and boundary agents. A predetermined load is transmitted from the virtual first material agent to the virtual second to n-th material agents and to the boundary agents based on a material property and a strain characteristic of the physical body along a load direction and orthogonal to the load direction.

4 Claims, 11 Drawing Sheets

OTHER PUBLICATIONS

USPTO English Translation of Nishi, Yasukaze et al., "Structural Analysis Based on Multiple Agents." Jul. 29, 1999. Translated May, 2005.*

Drashansky, T. et al. "Networked Agents for Scientific Computing." Communications of the ACM. Mar. 1999. vol. 42, Issue 3, pp. 48-54.*

Bieniasz, S., K. Cetnarowicz, E. Nawarecki, S. Kluska-Nawarecka. "Agent-Based Simulation in Finite Element Environment." Conf. Proc. Management and Control of Production and Logistics (MCPL 2000). Jul. 5-8, 2000. http://galaxy.uci.agh.edu.pl/~cetnar/.*

Grochowski, M. et al. "An Agent-Based Approach to a Hard Computing System—Smart Solid." Proc. Int'l Conf. on Parallel Computing in Electrical Engineering. (PARELEC '02). 2002. pp. 253-258.*

Cetnarowitcz, K. et al. "Functional Integrity of MAS through the Dynamics of the Agents' Population." Proc. Int'l Conf. on Multi-Agent Systems 1998. Jul. 3-7, 1998. pp. 405-406.*

Zabinska, M. et al. "Simulation Systems with Decentralized Knowledge Bases: Process of Agents' Orientation in Environment." 1996.*

Cetnarowitz, K. "Agent Oriented Technology Based on the M-Agent Architecture." Jun. 13, 2000.*

Nishi, Yasukazu et al. "Structural Analysis Based on Multiple Agents." Jul. 29, 1999. (Abstract in English).

English translation of Nishi, Yasukaze et al., "Structural Analysis Based on Multiple Agents" Jul. 29, 1999.

* cited by examiner (a)　　　　　　　　(b)

CALCULATION METHOD FOR PHYSICAL BODY DEFORMATION UNDER LOAD PROPAGATION

FIELD OF THE ART

The present invention relates to a calculation method for physical body deformation under load propagation for displaying a displacement of a total of a physical body by displaying movements of respective agents constituted by partitioning inside of the physical body into virtual predetermined shapes.

BACKGROUND OF THE ART

In recent years, in the field of so-to-speak entertainment such as movie or commercial, CG (Computer Graphics) animation has frequently been used.

However, in order to reproduce deformation or motion of a physical body by CG, the main current is to make the deformation or motion by trial and error such that the deformation or motion looks just as it is or recovery from dynamic picture by a motion capture system constituting a big facility and alleviation of artificial load has yet to reach.

In order to know such a displacement of a structure (object) by external force, conventionally, there has been reduced into practice a Finite Element Method (FEM for numerically solving differential equations for structural analysis (which is not limited to a structure but nonstructural analysis of heat or fluid is included of the object, along with emergence of high-speed large-sized computers, for example, a general purpose program such as NASTRAN has been developed.

According to the Finite Element Method, simply stating, in order to obtain a solving method, there are needed procedures of ① making a model of a physical body constituting an object physical body such that the object physical body can be solved by FEM, ② decomposing the object physical body into elements (in two-dimensional case, triangle or the like, in three-dimensional case, hexahedron or the like), ③ forming an element stiffness matrix, ④ forming a total stiffness matrix, ⑤ forming a stiffness equation and ⑥ solving the stiffness equation, for example, in the case of using triangular elements in a two-dimensional problem, nodes are set arbitrary positions of an object physical body having a predetermined shape, the object physical body is divided into elements by constituting the nodes as apexes of triangles (elements: finite number), simultaneous linear equations are formed with displacements of the respective nodes as unknown numbers and a state of the object physical body is provided as a solution from boundary conditions.

Hence, it is conceivable to integrate FEM (Finite Element Method) which is a method of accurately analyzing behavior of a physical body and a CG animation system to enable to know a displacement of a structure (object) by external force, however, the integration is not regarded as practical in consideration of a calculation time period, further, there poses a new problem that a CG creator must obtain specialized knowledge of FEM to some degree.

According to stereoscopic picture display by the above-described computer graphics animation, one sheet of picture is represented by several tens thousands through several million of polygons, for example, in order to display an object physical body, it is necessary to calculate a plurality of polygons by operation to form the object physical body, operation of enormous matrices (several tens thousands through several million for one picture) is carried out at each time, further, environmental setting of color, light source or the like with regard to the picture is assumed by person and thereafter calculated by a computer or the like, further, the calculation must be carried out for a plurality of pictures and with gigantic formation of program, processing load of computer is increased.

Further, in order to represent behavior of change in the shape of a physical body by computer graphics animation in a physically satisfying form, the change can be provided by using the Finite Element Method, however, when gigantic FEM program is integrated to CG animation program which is inherently gigantic, the program becomes further gigantic and there poses a problem that it is necessary to take into account shortening of an operation time period of a computer executing the program and a computer graphic designer must learn and utilize the Finite Element Method which requires specialized knowledge.

Further, according to current CG animation, although motion of a physical body is smooth, deformation of the physical body per se is not taken into consideration and therefore, for example, although a motion per se of a person is smooth, the shape of muscle remains as it is and also in a case moving a vehicle, although the vehicle per se is moved upwardly and downwardly or leftwardly and rightwardly, when the vehicle makes a turn at a curve, force exerted on a tire is not taken into consideration and therefore, in view of picture as a whole, there is unnaturalness in expression.

The present invention has been carried out in view of the above-described conventional situation and it is an object thereof to provide a method of displaying a load propagation displacement of a physical body capable of displaying a state of an object physical body in a simplified manner in which based on load exerted on a physical body, virtual agents are formed in a matrix shape, individual agents are deformed and load is transmitted to other face other than a load face under a predetermined condition.

DISCLOSURE OF THE INVENTION

In order to achieve the above-described object, the present invention according to claim 1 of the present application is a method of displaying a load propagation displacement of a physical body on a rigid physical body which undergoes displacement constraint from a surrounding in a boundary which does not undergo the displacement constraint from a surrounding, the method comprising a first material agent having a shape of a hexahedron or a plane virtually formed in the physical body at a position of a load exerted to an arbitrary position of the physical body, a second material agent having the same shape virtually formed at a contiguous face other than a face of the first material agent exerted with the load, a third, a fourth, . . . an n-th material agent virtually formed similarly and successively up to a boundary between the physical body and the boundary which does not undergo the displacement constraint in the physical body and/or the rigid physical body which undergoes the displacement constraint and boundary agents having predetermined shapes virtually formed at a contact face between the physical body and the boundary which does not undergo the displacement constraint and/or the rigid physical body which undergoes the displacement constraint, wherein in the material agents, with regard to a direction of the load, a predetermined load in accordance with a material property thereof is transmitted to an upper face and a lower face of the physical body in the load direction, a predetermined load in accordance with a strain characteristic of the physical body is transmitted to a face orthogonal to the load direction and a load which undergoes the predetermined displacement constraint is transmitted to an upper face in the load direction of other material agent contiguous to the material agent, with regard to the load, in the boundary agent formed in the boundary which does not undergo the displacement constraint, a load having a value the same as a value of the load from the contiguous material agent in the load direction is transmitted, and in the boundary agent formed in the rigid physical body which undergoes the displacement constraint, with regard to the load from the contiguous material agent, a load having a value the same as a value of the load is transmitted in a direction reverse to a direction of the load to thereby display the load propagation displacement of the physical body.

Further, the present invention according to claim 2 of the present invention relates to the display method according to claim 1 and is characterized in that the first through the n-th material agents are formed in a load propagation direction when the transmitted load is larger than a predetermined threshold value.

Further, the present invention according to claim 3 of the present application is a computer readable record medium recorded with a program for displaying a load propagation displacement of a physical body by a method of displaying a load propagation displacement of a physical body on a rigid physical body which undergoes displacement constraint from a surrounding in a boundary which does not undergo the displacement constraint from a surrounding by a computer screen, the method comprising a first material agent having a shape of a hexahedron or a plane virtually formed in the physical body at a position of a load exerted to an arbitrary position of the physical body, a second material agent having the same shape virtually formed at a contiguous face other than a face of the first material agent exerted with the load, a third, a fourth, . . . an n-th material agent virtually formed similarly and successively up to a boundary between the physical body and the boundary which does not undergo the displacement constraint in the physical body and/or the rigid physical body which undergoes the displacement constraint and boundary agents having predetermined shapes virtually formed at a contact face between the physical body and the boundary which does not undergo the displacement constraint and/or the rigid physical body which undergoes the displacement constraint, wherein in the material agents, with regard to a direction of the load, a predetermined load in accordance with a material property thereof is transmitted to an upper face and a lower face of the physical body in the load direction, a predetermined load in accordance with a strain characteristic of the physical body is transmitted to a face orthogonal to the load direction and a load which undergoes the predetermined displacement constraint is transmitted to an upper face in the load direction of other material agent contiguous to the material agent, with regard to the load, in the boundary agent formed in the boundary which does not undergo the displacement constraint, a load having a value the same as a value of the load from the contiguous material agent in the load direction is transmitted, and in the boundary agent formed in the rigid physical body which undergoes the displacement constraint, with regard to the load from the contiguous material agent, a load having a value the same as a value of the load is transmitted in a direction reverse to a direction of the load to thereby display the load propagation displacement of the physical body.

Further, the present invention according to claim 4 of the present application relates to the computer readable record medium recorded with the program described in claim 3 and is characterized in that the first through the n-th material agents are formed in a load propagation direction when the transmitted load is larger than a predetermined threshold value.

BEST MODE FOR CARRYING OUT THE INVENTION

A detailed explanation will be given as follows in reference to the drawings of an embodiment of a method of displaying load propagation displacement of a physical body according to the present invention, particularly of a state in which when load is exerted to an arbitrary position of an object physical body, by using a concept of a material agent in the physical body formed from the arbitrary position to a boundary of the physical body and a boundary agent formed at a boundary of the physical body, displacement of the physical body is displayed from agents forming procedure and a load propagation procedure.

Figure 1:
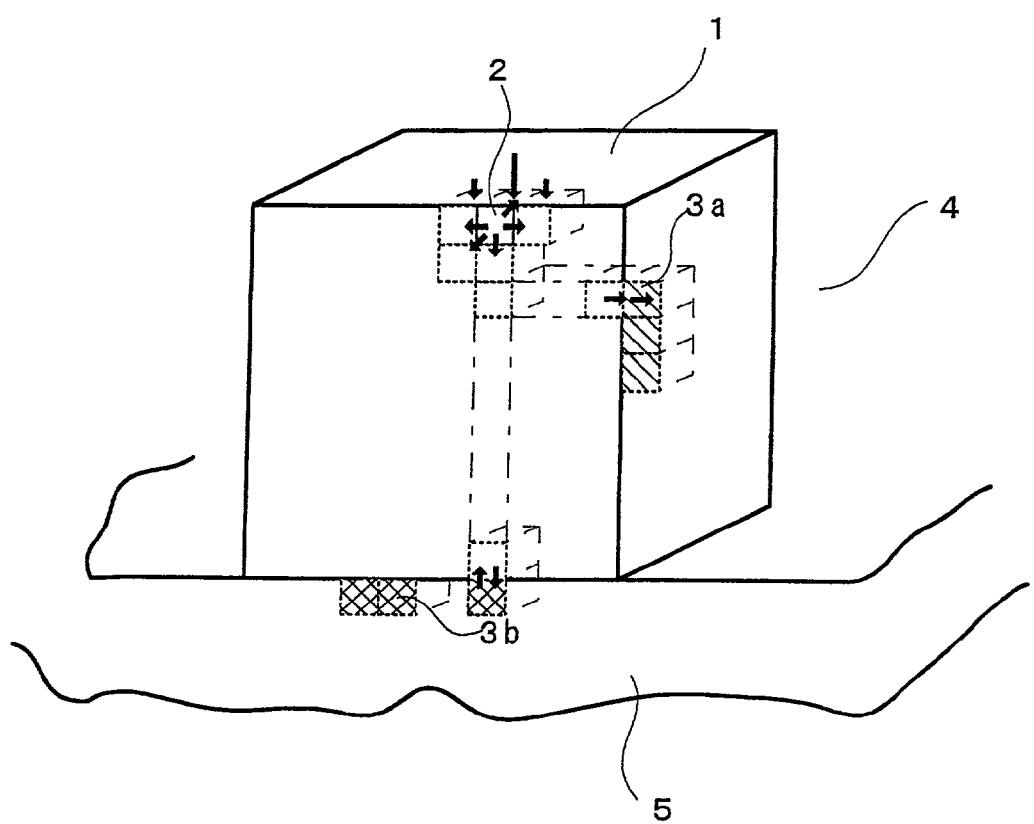
FIG. 1 is a constitution view showing agent formation of an object physical body for displaying load propagation displacement of the physical body according to an embodiment of the present invention.
Figure 2:
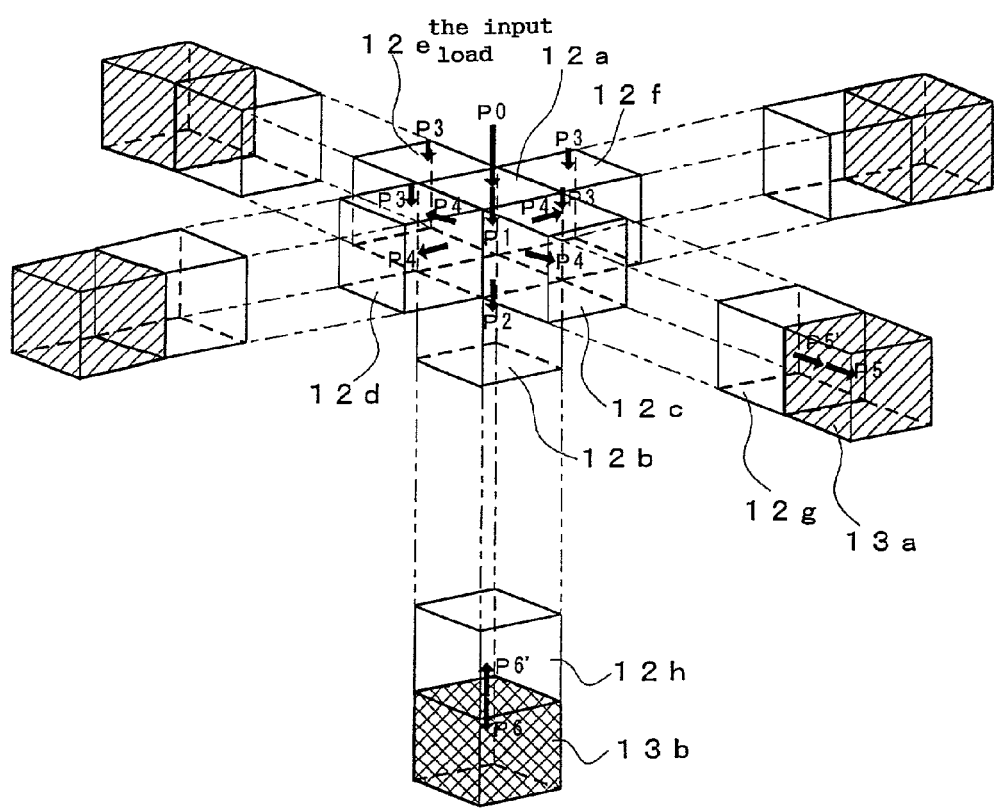
FIG. 2 is a conceptual view of operation in a case of exerting predetermined input load to a material agent of a physical body for displaying load propagation displacement of the physical body according to an embodiment of the present invention.

FIG. 1 is an outline constitution view showing that in a physical body 1 according to the embodiment, when load is exerted to an arbitrary position thereof, a first agent is virtually formed at the position, the load is transmitted in the physical body 1 and is transmitted to boundaries of the physical body 1, several agents are formed and at the boundaries of the physical body 1, new agents 3a and 3b are formed and FIG. 2 is a view of load propagation operation showing in further details how the load is transmitted among the respective agents.

In FIG. 1, notation 1 designates the physical body constituting an object physical body, notation 2 designates a first material agent formed at, for example, an arbitrary load position of an elastic physical body, notation 3a designates an agent formed at a boundary of the physical body 1, which is a boundary agent formed at a boundary which dose not undergo displacement constraint from the surrounding and notation 3b designates an agent formed at a boundary of the physical body 1, which is a boundary agent formed in the rigid physical body which undergoes displacement constraint from the surrounding. Further, notation 4 designates a boundary at which the object physical body 1 according to the embodiment is arranged and which does not undergo displacement constraint from the surrounding, for example, air and notation 5 designates a boundary at which the object physical body 1 according to the embodiment undergoes displacement constraint from the surrounding, for example, a rigid physical body.

That is, there is shown how the load exerted to the physical body 1 is transmitted in the physical body 1 and how the load finally displaces (deforms) the physical body 1 and according to the embodiment, when the load is exerted to the arbitrary portion of the object 1, a respective agent is formed at the position, the first material agent 2 partitioned in a predetermined virtual three-dimensional physical body is formed, thereafter, up to an n-th agent 2 in an n-th order is formed at a boundary of the physical body 1. Further, an explanation will be given by assuming the boundary agent 3a formed at a boundary in boundaries which do not undergo displacement constraint from the surrounding and the boundary agent 3b formed at a boundary in boundaries which undergo displacement constraint from the surrounding in the state of arranging the physical body 1.

[Premise of Forming Agent]

Further, with regard to formation and load transmission of respective agents in the following, a description will given here of basically a two-dimensional structure of a square firstly for convenience to facilitate understanding and a description will be given later of a three-dimensional structure constituted by a cube. That is, as an assumption of arrangement, according to the embodiment, a two-dimensional object physical body arranged in predetermined boundaries is assumed and expression of displacement of respective portions of the two-dimensional object physical body will be tried in reference to FIG. 3 through FIG. 6 when load is applied at a certain position in the two-dimensional object physical body.

[Operation of Material Agent (Part 1)]

The material agent 2 is an assumed object having a virtual shape which is assumed to display displacement in correspondence with external force exerted to the object physical body by virtually partitioning inside of the two-dimensional object physical body by a predetermined shape for example, 'square') and one material agent 2 (for example, first material agent 2a) is formed at an arbitrary position of the two-dimensional object physical body.

When the first material agent 2a is formed, a second material agent 2b having a shape the same as that of the material agent 2a is formed at a position at which an upper side of the second material agent 2b is brought into contact with a bottom side (BOTTOM edge) $2a_2$ of the material agent 2a in a direction the same as that of a direction of exerting input load $P_0$.

Further, when the first material agent 2a is formed, at one side (LEFT edge) $2a_3$ of the first material agent 2a, there is formed a second material agent 2c having a shape the same as that of the first material agent 2a and at other side (RIGHT edge) $2a_4$ of the material agent 2a, a similar second material agent 2d is formed.

Figure 3:
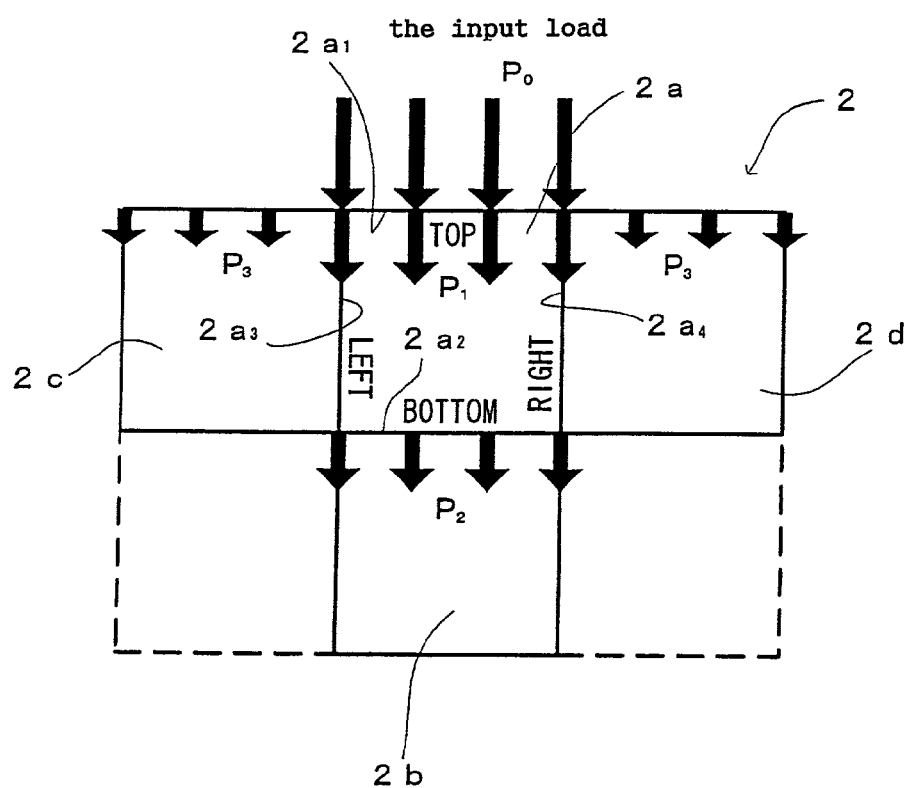
FIG. 3 is a conceptual view of operation in the case of exerting predetermined input load to a two-dimensional material agent for displaying load propagation displacement of a physical body according to an embodiment of the present invention.

FIG. 3 is a conceptual view of load transmission in a vertical direction when predetermined input load is exerted to the material agent 2a and all of following material agents formed at the respective portions are assumed to carry out following propagation operation.

According to the embodiment, the material agent 2a is constituted by a square and is constituted by a top side TOP edge) $2a_1$, exerted with the input load $P_0$, a bottom side (BOTTOM edge) $2a_2$ to which load is transmitted in a direction the same as a direction of exerting the input load $P_0$, the one side (LEFT edge) $2a_3$ and the other side RIGHT edge) $2a_4$.

When the input load $P_0$ is exerted from an upper direction to the material agent 2, the first material agent 2a is formed, the load is transmitted directly below the first material agent 2a and the second material agent 2b is formed in the direction of propagation the load.

For example, when a force received by the top side TOP edge) of the first material agent 2a is designated by load $P_1$, the load $P_1$ becomes load $P_1$ of the input load $P_0$ multiplied by a predetermined transmission coefficient $\alpha_1$ ($P_1=\alpha_1 P_0$) and when a force received by a top side (TOP edge) of the second material agent 2b is designated by load $P_2$, the load $P_2$ becomes load $P_2$ of the load $P_1$ multiplied by a predetermined transmission coefficient $\alpha_2$ ($P_2=\alpha_2 P_0$).

Further, when the input load $P_0$ is exerted from the upper direction to the material agent 2, there is formed a second material agent 2c other side (RIGHT edge) $2c_4$ of which is brought into contact with the one side (LEFT edge) $2a_3$ of the first material agent 2a (in FIG. 3, left side of the material agent 2a), a friction force is produced between the one side (LEFT edge) $2a_3$ of the material agent 2a and the other side (RIGHT edge) $2c_4$ of the material agent 2c and load having a direction the same as a direction of propagation the load $P_0$ is exerted to a top side (TOP edge) $2c_1$ of the material agent 2c.

In this case, a force received by the top side TOP edge) $2c_1$ of the material agent $2c$ becomes load $P_3$ of the load $P_0$ multiplied by a predetermined transmission coefficient $\alpha_3$ ($P_3=\alpha_3 P_0$) similarly, there is formed a second material agent $2d$ one side (LEFT edge) of which is brought into contact with the other side (RIGHT edge) $2a_4$ of the first material agent $2a$ (right side of the material agent $2a$ in FIG. 3) and a force received by a top side TOP edge) $2d_1$ of the second material agent $2d$ also becomes load $P_3$ of the load $P_0$ multiplied by the predetermined transmission coefficient $\alpha_3$ ($P_3=\alpha_3 P_0$).

That is, when the top portion of the object physical body receives the input load $P_0$, the object physical body transmits the load $P_1$ multiplied by the predetermined transmission coefficient $\alpha_1$ in the direction the same as that of input load $P_0$ to thereby form the first material agent $2a$ in the propagation direction. Then, the load $P_2$ multiplied by the predetermined transmission coefficient $\alpha_2$ is transmitted to directly below the first material agent $2a$ and the second material agent $2b$ is formed in the propagation direction. Further, when the top portion of the second material agent $2b$ receives the load $P_1$ the second material agent $2b$ transmits load multiplied by a predetermined transmission coefficient to directly below the second material agent $2b$ and a successive third material agent (not illustrated in FIG. 3) is formed and receives and successively transmits load multiplied by a predetermined transmission coefficient.

Further, the input load $P_0$ received by the top portion of the first material agent $2a$ formes the second material agent $2c$ and the second material agent $2d$ contiguous to the first material agent $2a$ constituting the load propagation direction and by the friction force produced between the second material agent $2c$ and the second material agent $2d$, and the first material agent $2a$, the top sides of the second material agent $2c$ and second material agent $2d$ are applied with the load $P_3$ of the input load $P_0$ multiplied by the predetermined transmission coefficient $\alpha_3$.

Further, the second agents $2c$ and $2d$ transmit load of the load $P_3$ multiplied by the predetermined transmission coefficient $\alpha_1$ with the load $P_3$ as input load and successive material agents formed directly below the second agents $2c$ and $2d$, are successively transmitted with load of the load $P_3$ multiplied by the predetermined transmission coefficient $\alpha_2$.

In this way, with regard to the input load $P_0$, there are repeated transmission of load and formation of material agents in areas in the direction of forming load to be transmitted (direction the same as that of the input load $P_0$) until load transmitted in the direction the same as that of the input load $P_0$ is equal to or smaller than a value which is regarded as effective for being transmitted successively, that is, a predetermined threshold value $\gamma$.

[Operation of Material Agent (Part 2)]

Figure 4:
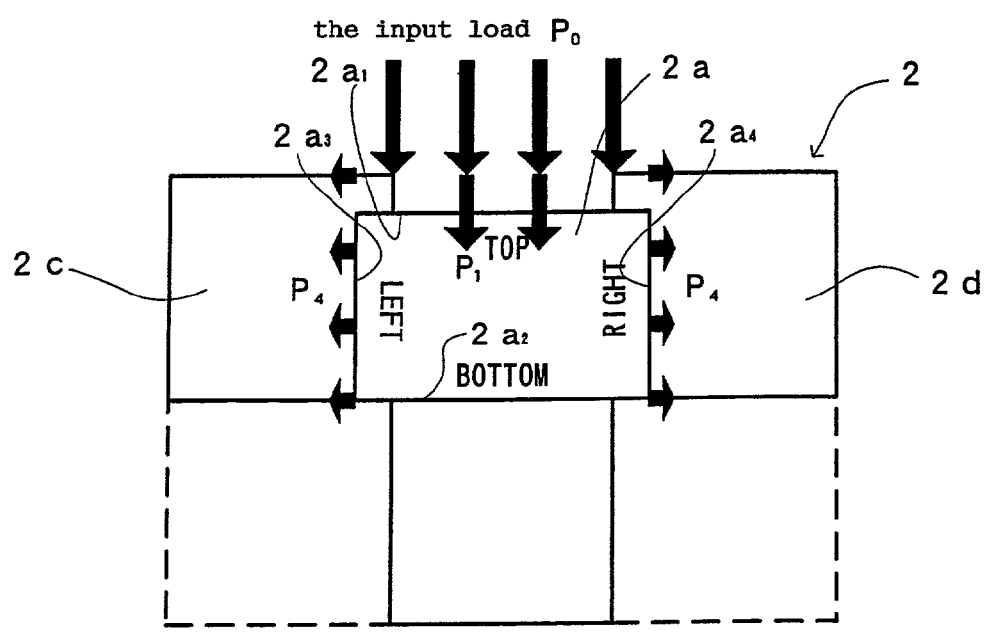
FIG. 4 is a conceptual view of operation by load transmitted in a direction orthogonal to a direction of input load in the case of exerting predetermined input load to a two-dimensional material agent for displaying load propagation displacement of a physical body according to an embodiment of the present invention.

Next, FIG. 4 is a conceptual view of operation by load transmitted in a direction orthogonal to the input direction of the input load $P_0$ when the predetermined input load $P_0$ is exerted to the material agent 2 and similar to the above-described material agent 2, the first material agent $2a$ is formed at an arbitrary position of the two-dimensional object physical body.

After forming the first material agent $2a$, the first material agent $2a$ transmits load in a direction orthogonal to the direction of exerting force component $P_1$ of the input load $P_0$ ($P_1=\alpha_1 P_0$, $\alpha_1$: transmission coefficient). This is because when the first material agent $2a$ is pressed to crush by a load exerted to the first material agent $2a$, there is exerted load of spreading the first material agent $2a$ in the direction orthogonal to the direction of exerting the force component $P_1$ of the input load $P_0$.

Similar to the above-described, the first material agent $2a$ is constituted by a square and is constituted by the top side (TOP edge) $2a_1$ exerted with the input load $P_0$, the bottom side (BOTTOM edge) $2a_2$ propagation load in the direction the same as the direction of exerting the force component $P_1$ of the input load $P_0$, the one side (LEFT edge) $2a_3$ propagation load in the direction orthogonal to the direction of exerting the force component $P_1$ of the input load $P_0$ and the other side (RIGHT edge $2a_4$ propagation load in the direction orthogonal to the direction of exerting the force component $P_1$ of the input load $P_0$, when load is transmitted to the one side (LEFT edge) $2a_3$ of the first material agent $2a$, there is formed the second material agent $2c$ having the shape the same as that of the first material agent $2a$ and when load is transmitted to the other side (RIGHT edge) $2a_4$ of the first material agent, similarly, the second material agent $2d$ is formed.

In reference to FIG. 4, in the first material agent $2a$, when the input load $P_0$ is received, a face opposed to the load face ($2a_2$ face in FIG. 4) is temporarily constrained by the force component $P_1$, strain ($\epsilon$) is produced by Hook's law (strain of elastic physical body is proportional to stress), the first material agent $2a$ is contracted in the direction the same as the direction of exerting the force component $P_1$ of the input load $P_0$ and is spread based on Poissons' ratio ($\nu$) in the direction orthogonal to the direction of exerting the force component $P_1$ of the input load $P_0$.

That is, according to the first material agent $2a$, when the load in the direction orthogonal to that of the force component $P_1$ of the input load $P_0$ is transmitted to the one side (LEFT edge), the second material agent $2c$ is formed in contact with the one side (LEFT edge) $2a_3$ of the first material agent $2a$ and the second material agent $2d$ is formed in contact with the other side (RIGHT edge $2a_4$.

By forming the second material agent $2c$ and the second material agent $2d$, the material agent $2a$ which receives the input load $P_0$ is spread to the one side (LEFT edge) $2a_3$ and the other side (RIGHT edge) $2a_4$ by an amount of strain ($\epsilon_x=-\beta\cdot\nu\cdot\epsilon_y$ ($\beta$: transmission coefficient)).

Then, the side of the other side (RIGHT edge) of the second material agent $2c$ receives load $P_4(P_4=(1-\beta)\cdot\nu\cdot\epsilon_y\cdot A_3\cdot E$ ($A_3$-E ($A_3$: sectional area of $2a_3$ face, E: Young's modulus of material)) and the side of the one side (LEFT edge) of the second material agent $2d$ receives load $P_4$ ($P_4=(1-\beta)\cdot\nu\cdot\epsilon_y\cdot A_4\cdot E$) having an amount same as that of the load $P_4$ which the second material agent $2c$ receives in a direction reverse thereto.

Further, with regard to the input load $P_0$, there are repeated transmission of load until load transmitted orthogonally to the input load $P_0$ becomes equal to or smaller than the predetermined threshold value $\gamma$ and formation and load transmission of material agents in areas in the direction of forming the load (the vertical direction).

[Operation of Boundary Agent which does not Undergo Displacement Constraint]

Figure 5:
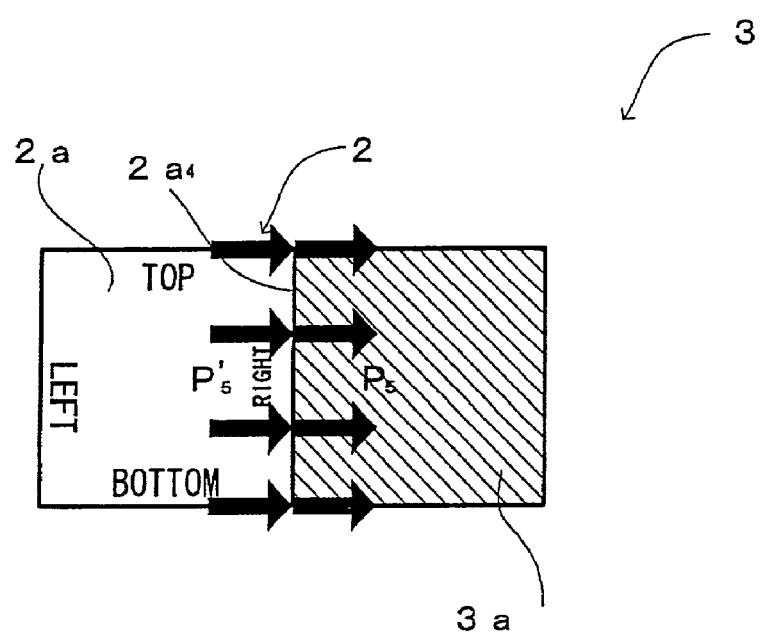
FIG. 5 is a conceptual view of operation by load transmitted to a boundary agent which does not undergo displacement constraint in a direction of input load of a material agent orthogonally thereto in the case of exerting predetermined input load to a two-dimensional material agent for displaying load propagation displacement of a physical body according to an embodiment of the present invention.

FIG. 5 schematically shows, in the case in which predetermined input load is exerted to the material agent 2, for example, when the physical body 1 is disposed in a boundary which does not undergo displacement constraint from the surrounding, what influence is effected from the boundary to the physical body 1 and is a conceptual view of operation in which when the side $2a_4$ of the second material agent 2 formed at a boundary of the physical body 1 is brought into contact with, for example, air 4, with regard to the input load by the side (RIGHT edge), there is shown what load is transmitted in the boundary agent 3a, to thereby show an amount and a direction of the load.

In FIG. 5, when load in a direction orthogonal to the side (RIGHT edge) $2a_4$ of the material agent 2 is applied, the boundary agent 3a is formed in contact with the side (RIGHT edge) $2a_4$ of the material agent 2 and load $P_5$ exerted from the side (RIGHT edge) $2a_4$ of the material agent 2 is returned to the material agent 2a by the boundary agent 3a as load $P_5'$ having the same magnitude and same direction.

In this case, when the load transmitted to the material agent $2a_4$ is equal to or smaller than the threshold value, the boundary agent 3a is not formed and the load is not transmitted.

[Operation of Boundary Agent which Undergoes Displacement Constraint]

Figure 6:
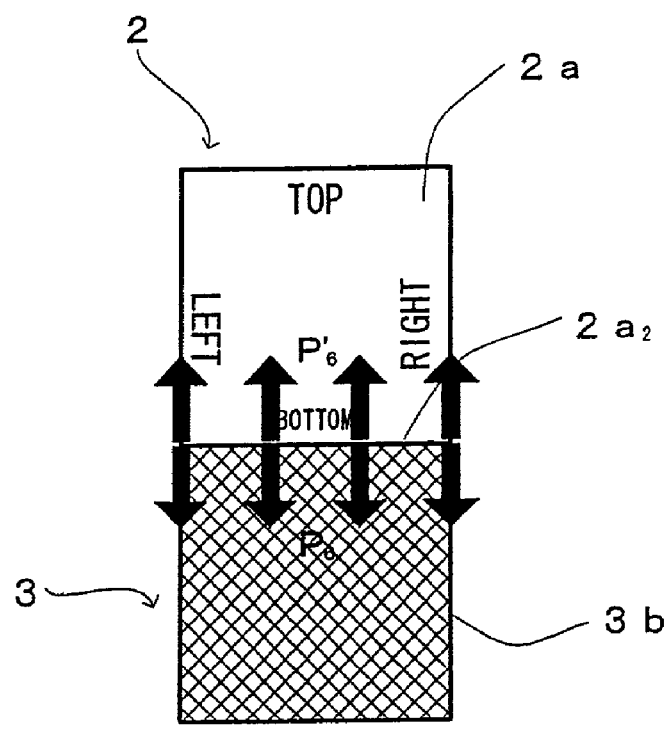
FIG. 6 is a conceptual view of operation with regard to input load in arranging a boundary agent which undergoes displacement constraint by a bottom portion of a material agent and returns the input load as it is in the case of exerting predetermined input load to a two-dimensional material agent for displaying load propagation displacement of a physical body according to an embodiment of the present invention.

FIG. 6 is a conceptual view of operation in which in the case of exerting predetermined input load to the material agent 2, for example, when the material agent 2a is brought into contact with the rigid physical body 5, in the boundary agent 3b formed there, there is shown what load is transmitted in correspondence with the input load, to thereby show an amount and a direction of the load.

In FIG. 6, when load $P_6$ having the direction the same as that of the input load $P_0$ is transmitted from the bottom side (BOTTOM edge) $2a_2$ of the material agent 2a which receives the input load $P_0$ (not illustrated in FIG. 6), the rigid physical body 5 is formed with the boundary agent 3b in the square shape according to the embodiment similar to the material agent 2. Further, in correspondence with load $P_6$ transmitted from above (TOP edge) of the boundary agent 3b, load $P_6'$ having an amount the same as that of the load $P_6$ is returned from the boundary agent 3b to the material agent 2a. This is because the position of forming the boundary agent 3b is disposed in the rigid physical body 5 and strain is not produced by the load received from the material agent 2a. Further, similar to the above-described, when the load transmitted to the material agent $2a_2$ is equal to or smaller than the predetermined threshold value γ, the boundary agent 3b is not formed and the load is transmitted.

In this way, according to the material agent 2 successively formed in the direction the same as the direction of exerting the input load $P_0$ or the direction orthogonal to that of the input load $P_0$, load transmitted from the material agent 2 declines based on the predetermined conduction factor. For example, assuming an elastic physical body such as rubber, when predetermined input load is exerted to a portion of a top face of the rubber (elastic physical body), a position thereof exerted with the input load is significantly recessed (warped), the more remote the distance from the input load position, the smaller the recess (warp), when the rubber (elastic physical body) formed with material agent is mounted on a rigid physical body (boundary agent 3) such as, for example, a concrete base, load transmitted from the rubber (elastic physical body) is exerted to the concrete base (rigid physical body) and the load amount is returned to the rubber (elastic physical body) and strain is not produced at all in the concrete face (rigid physical body).

Next, with regard to a method of displaying movements of the respective agents of the above-described two-dimensional object physical body, an explanation will be given of a behavior of actually calculating by a computer and displaying on a screen, movement of the two-dimensional object physical body.

Incidentally, a computer used in the embodiment is a personal computer having a memory of 128 Mbyte and mounted with CPU of Celeron 400 MHz made by intel Co. and as software, JAVA language (Ver.1.1.7) with Swing 1.1 made by SunMicrosystems Co. and VisualCafe Ver 3.0c made by Symantec Co. are used.

Figure 7:
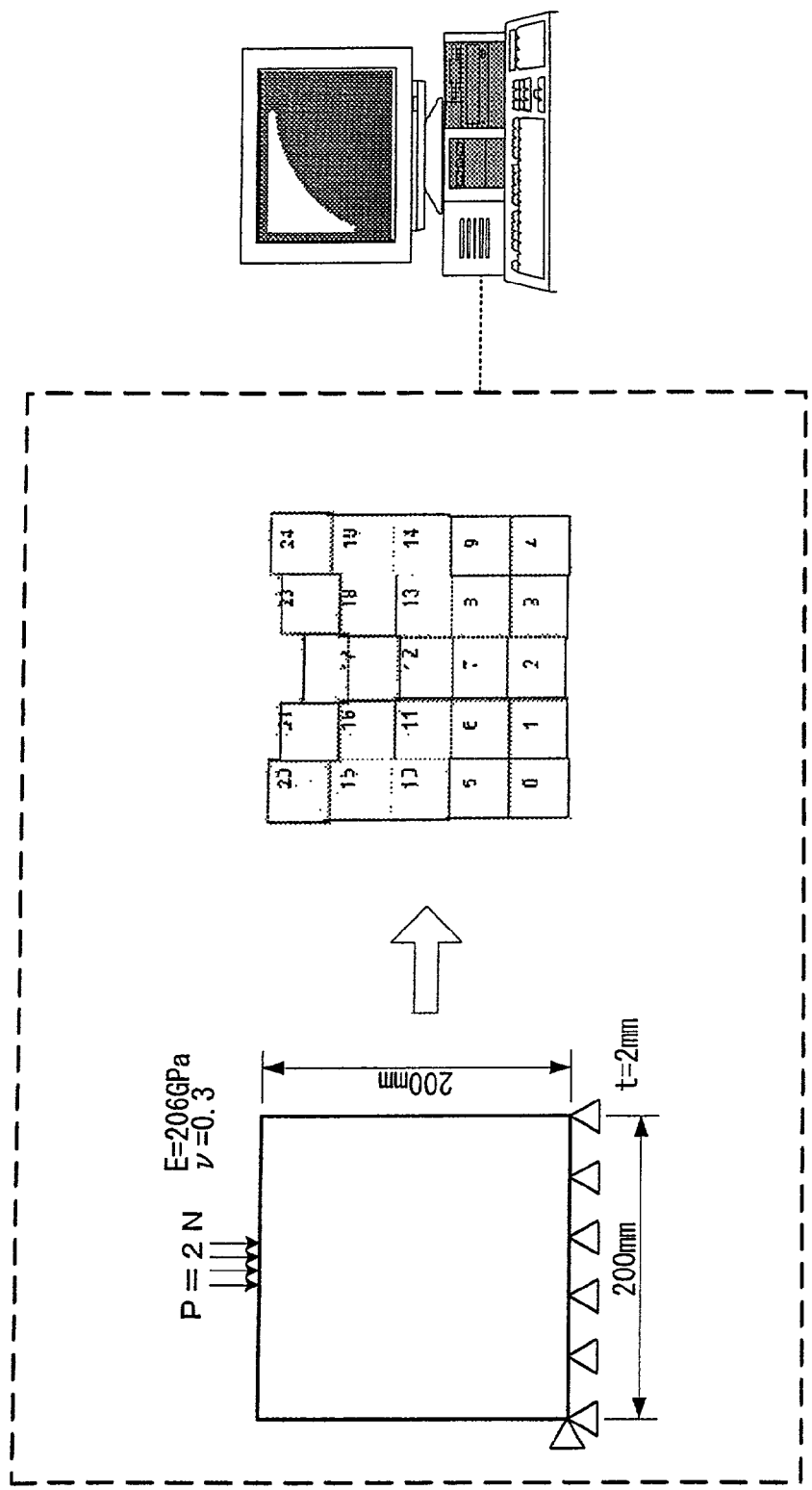
FIG. 7 is an explanatory view of an object physical body and a behavior of subjecting the object physical body to agent formation to display by utilizing a computer for displaying movement of a physical body according to an embodiment of the present invention.

FIG. 7 is an explanatory view of a behavior of subjecting a two-dimensional object physical body to agent formation and displaying load propagation displacement of input load is exerted to a portion of a top face of the rubber (elastic physical body), a position thereof exerted with the input load is significantly recessed (warped), the more remote the distance from the input load position, the smaller the recess (warp), when the rubber (elastic physical body) formed with material agent is mounted on a rigid physical body (boundary agent 3) such as, for example, a concrete base, load transmitted from the rubber (elastic physical body) is exerted to the concrete base (rigid physical body) and the load amount is returned to the rubber (elastic physical body) and strain is not produced at all in the concrete face (rigid physical body).

Next, with regard to a method of displaying movements of the respective agents of the above-described two-dimensional object physical body, an explanation will be given of a behavior of actually calculating by a computer and displaying on a screen, movement of the two-dimensional object physical body.

Incidentally, a computer used in the embodiment is a personal computer having a memory of 128 Mbyte and mounted with CPU of Celeron 400 MHz made by intel Co. and as software, JAVA language (Ver.1.1.7) with Swing 1.1 made by SunMicrosystems Co. and VisualCafe Ver 3.0c made by Symantec Co. are used.

FIG. 7 is an explanatory view of a behavior of subjecting a two-dimensional object physical body to agent formation and displaying load propagation displacement of the physical body by utilizing the computer.

In this case, with regard to a method of displaying load propagation displacement of a physical body according to the invention, a program of a display method may previously be recorded to a computer readable record medium and the program may be read from the record medium.

First, as information of a virtual object physical body, there are given to the computer, a flat plate constituted by sizes of a width of 200 mm, a height of 200 mm and a thickness of 2 mm, as conditions of material agents, Young's modulus of 206 Gpa, Poissons' ratio 0.3, input load from upper direction of 2 N, as conduction factor of material agents, there are previously given $α_1=0.5$, $α_2=0.25$, $α_3=0.25$ and $β=0.5$ further, there is given the threshold value $γ=10E-3$.

When the above-described conditions of the object physical body (material agents) are inputted to the computer and the input load (for example, the above-described load of 2N) is given to an arbitrary position of the object physical body from above in a lower direction, the material agent 2 is formed when the transmitted load is larger than the threshold value γ and deformation and load transmission of the material agent 2 are carried out.

When the calculation of deformation and transmitted load has been finished until the transmitted load becomes smaller than the predetermined threshold value δ for all of formed agents, the result is displayed to, for example, a display apparatus, a printer or the like connected to the computer and motion of the two-dimensional object physical body is displayed.

Further, although the conditions of the object physical body (material agents) may be inputted for each object physical body, conditions of a plurality of object physical bodies may previously be inputted, formed into a data base and stored.

Figure 8:
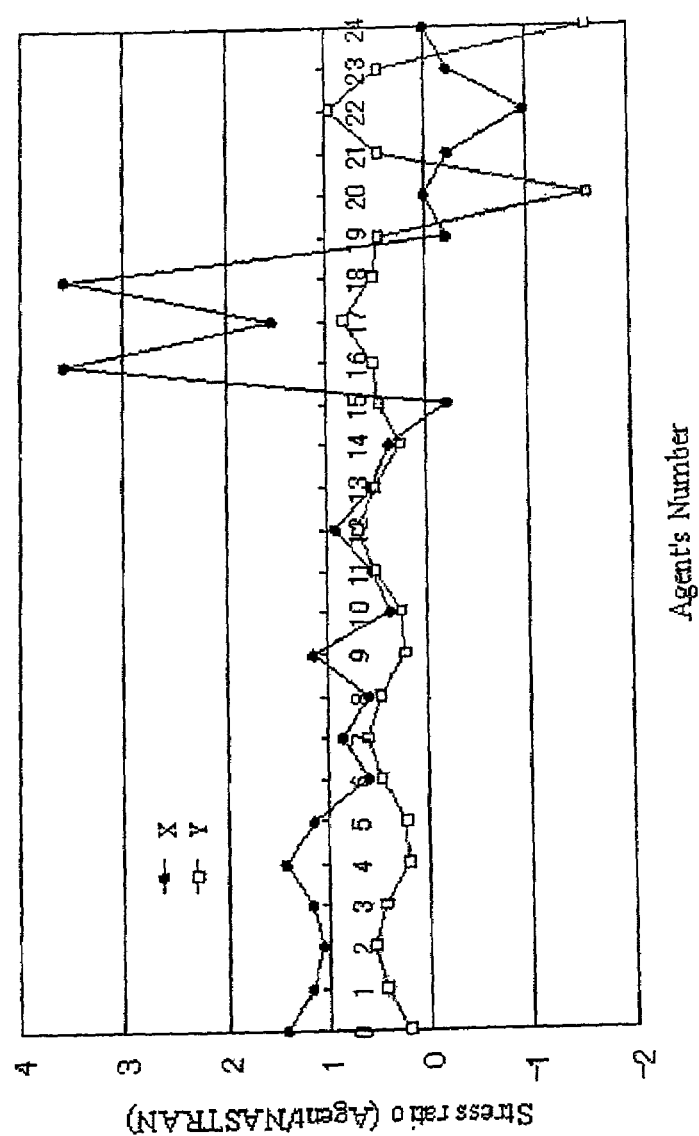
FIG. 8 is a graph of stress comparison respectively comparing x-direction and y-direction stresses between agents and FEM according to an embodiment of the present invention.
Figure 9:
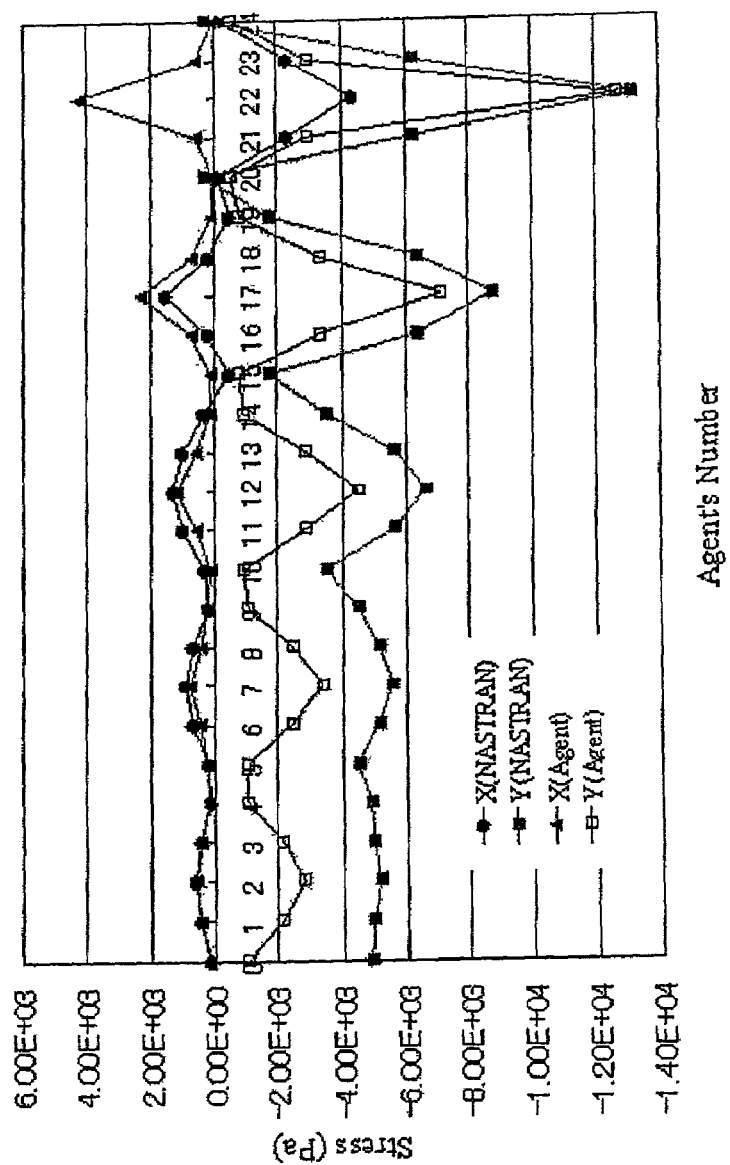
FIG. 9 is an explanatory view for displaying a result of deforming an object physical body by a method of displaying load propagation displacement of a physical body according to an embodiment of the present invention.

FIG. 8 is a graph representing ratios of stress values in x-direction and y-direction by a method of displaying motion of the physical body (plane) according to the present invention (the agents), to stress values in x-direction and y-direction by conventional FEM analysis, further, FIG. 9 is a graph of stress comparison for respectively comparing stresses in x-direction and y-direction between the above-described agent and FEM and in either of the graphs, tendencies are substantially coincident, particularly, with regard to x-direction of the stress comparison graph (refer to FIG. 9), the tendencies are substantially coincident.

Figure 10:
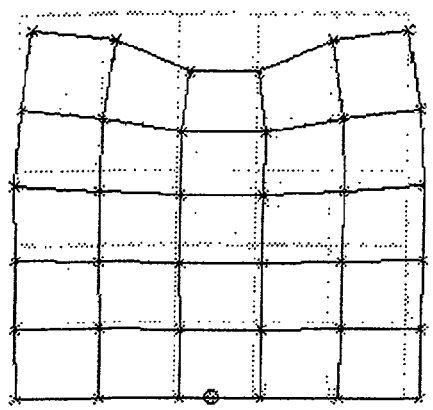
FIG. 10 is a graph representing ratios of stress values in x-direction and y-direction by a method of displaying load propagation displacement of a physical body (plane) (the agents) according to an embodiment of the present invention, to stress values in x-direction and y-direction according to conventional FEM analysis.

FIG. 10 illustrates explanatory views displaying the result of deforming the object physical body, FIG. 10 (a) shows a result calculated by conventional FEM when input load is given to the object physical body and FIG. 10 (b) represents deformations (strains) of respective agents when the input load is given to the object physical body and outline tendencies are indicated in substantially the same mode.

In this case, according to the display method of the present application, with regard to portions at which external force is not operated to the object physical body, agent formation and load transmission are not carried out and initial states are displayed as they are.

Figure 11:
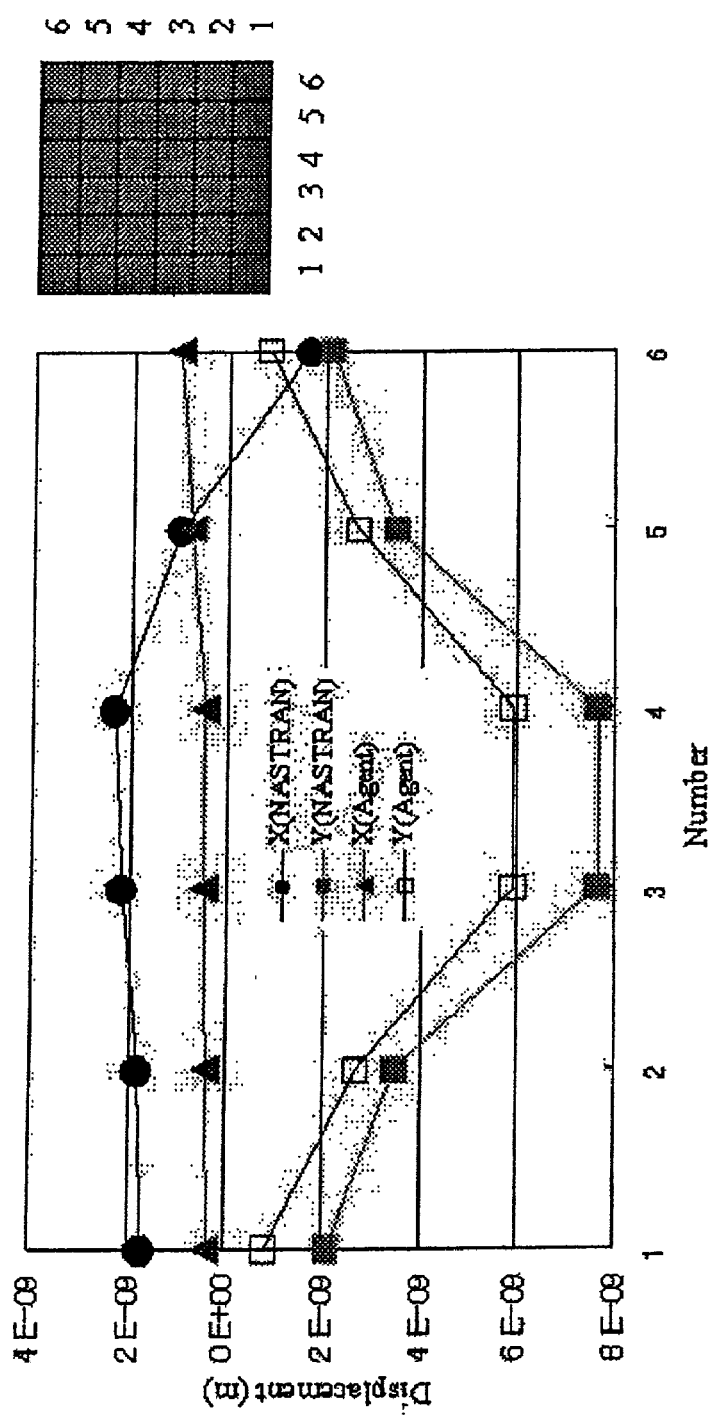
FIG. 11 is a graph comparing displacements of a method of displaying load propagation displacement of a physical body (plane) (the agents) according to an embodiment of the present invention and conventional FEM analysis.

Further, FIG. 11 is a graph comparing displacements of the method of displaying the motion of the physical body (plane) according to the present invention (the agents) and conventional FEM analysis and also according to the graph, tendencies of both remain the same.

In this way, when represented by a matrix having a size the same as that of conventional FEM, although there is a roughness, the calculation is simple and fast and therefore, by subjecting the object physical body to small agent formation and adjusting the conduction factor, substantially similar to display by FEM, the tendency of the displacement of the physical body can sufficiently be displayed.

Further, when with regard to the above-described agents, the input load is repeatedly displayed by, for example, 0.1 N increment up to 2 N, movement of a procedure of deforming the object physical body can be displayed.

Although until here, an explanation has been given two-dimensionally of the material agent 2 and the boundary agent 3, next, as a second embodiment, an explanation will be given three-dimensionally of the material agent 2 and the boundary agent 3 as a method of displaying motion of the physical body according to the present invention.

FIG. 2, mentioned above, is a load propagation operation view of a three-dimensional object physical body (agent) according to the embodiment and notation 12 assumes a material agent and notation 13 assumes a boundary agent.

For example, when the input load $P_0$ is exerted to a predetermined position of the material agent 12, according to the embodiment, for example, a material agent 12a of a cube is formed, when the material agent 12a is formed, based on the predetermined transmission coefficient $\alpha_1$, the load $P_1$ in the direction the same as that of the input load $P_0$ is transmitted, successively, at a bottom face of the material agent 12a in the direction the same as at of the input load $P_1$, successively, at a bottom face of the material agent 12a disposed in a direction the same as that of the input load $P_1$, based on the predetermined transmission coefficient $\alpha_2$, the load $P_2$ in the direction the same as that of the input load $P_o$ is transmitted, there is formed a material agent 12b having a shape the same as that of the material agent 12a, an upper face of which is brought into contact with an area in the propagation direction (bottom face of material agent 12a) and material agents 12 are successively formed and load is transmitted in the direction the same as that of the input load $P_0$ until the load becomes equal to or smaller than the predetermined threshold value γ or a material agent 12h is reached.

Further, when the material agent 12a is formed, in a direction the same as the direction of exerting the input load $P_0$, that is, at four side faces of the material agent 12a, friction forces are exerted, similar to the above-described first embodiment, based on the predetermined transmission coefficient $\alpha_3$, the load $P_3$ in the direction the same as that of the input load $P_0$ is transmitted and there are respectively formed material agents 12c, 12d, 12e and 12f having a shape the same as that of the material agent 12a.

That is, in FIG. 2, at a front side face on the right side of the material agent 12a, the material agent 12c is formed, at a front side face on the left side of the material agent 12a, the material agent 12d is formed, at a rear side face on the LEFT edge side, the material agent 12e is formed and at a rear side face on the right side, the material agent 12f is formed, respectively.

Further, similar to the above-described formation of agents and load transmission, the material agent 12a is pressed to crush by receiving the force component $P_1$ of the input load $P_0$ and is spread in the horizontal direction by the amount of strain and load $P_4$ ($P_4=(1-\beta)\cdot v\cdot\epsilon_y\cdot A\cdot E$ (A: sectional area of a side face of the material agent 2a, E: Young's ratio of material)) is transmitted in directions vertical to the respective side faces (four directions according to embodiment) (directions orthogonal to the input load $P_0$).

Further, when loads $P_n$ are transmitted to the respective material agents 12c, 12d, 12e, 12f . . . , material agents 12 are formed and load is transmitted until load becomes the predetermined threshold value ν or material agents 12g are reached, successively, similarly, material agents (not illustrated in FIG. 2) are formed in contact with side faces of the material agent 12b and load is transmitted.

Further, similar to the above-described, when a side face of the material agent 12g is a boundary which is not subjected to displacement constraint (for example, in air), the boundary agent 13a is formed and load $P_5$ exerted from one side face thereof to be returned to the material agent 12g, is exerted to the boundary agent 13a as load $P_5'$ as it is.

Further, when load $P_6$ in the direction the same as that of the input load $P_0$ is transmitted from a bottom face of the material agent 12h propagation load by receiving the force component $P_1$ of the input load $P_0$, there is formed a boundary agent 13b of a cube at a boundary subjected to displacement constraint (for example, rigid physical body) and with regard to the load $P_6$ transmitted from the upper face of the boundary agent 13b, load $P_6'$ having an amount the same as that of the load $P_6$ is returned from the boundary agent 13b to the material agent 12h.

In this way, also with regard to the three-dimensional physical body, similar to the above-described two-dimensional structure object physical body, the respective agents are formed and load is transmitted and behavior of displacement can easily be calculated.

Further, although according to the above-described embodiments, an explanation has been given such that the shape of the respective agent is a square or a cube, the shape may be a regular polygon or a regular polyhedron (for example, regular hexagon, regular hexahedron) and the shape is not particularly limited so far as agents having the same shape are formed contiguously with no gap therebetween.

Further, although according to the above-described embodiments, an explanation has been given such that a boundary agent which does not undergo displacement constraint is air, the boundary agent may be water (liquid), vacuum or gasses of specified kinds and composition of the boundary agent is not particularly limited.

Further, although according to the above-described embodiments, an explanation has been given such that a boundary agent which undergoes displacement constraint is a rigid physical body, other than the rigid physical body, the boundary agent may be other physical body having a transmission coefficient and in that case, operation (having different transmission coefficient) may be carried out by a method similar to that of the above-described material agent.

INDUSTRIAL APPLICABILITY

According to the method of displaying load propagation displacement of a physical body of the present invention, with regard to load to an object physical body, a first one of agents is formed, load is transmitted while forming agents successively from the agent based on predetermined conduction factor and accordingly, the method is easily applicable to displacement analysis of a physical body in the field of physics, particularly, strength of materials, further, in the field of computer graphics, the method can be integrated to an application program such as game or the like and formation of computer graphics animation can simply be realized when a displayed deformed state of a physical body is displayed. Thereby, there is no need of learning and utilizing the finite element method requiring specialized knowledge, further, the program is simplified and therefore, there is achieved an advantage of capable of achieving to shorten an operation time period (time period required for displaying displacement of physical body) of a computer executing thereof.

Further, according to the method of displaying load propagation displacement of a physical body of the invention, with regard to portions which do not receive load (equal to or lower than predetermined threshold value) there is no need of carrying out formation of agents and transmission of load and accordingly, whereas conventionally, in displaying partial displacement of a physical body, a state of a total is to operate, there is no need of carrying out operation with regard to portions having no displacement and therefore, there are achieved extremely excellent characteristic and effect of capable of significantly shortening the operation time period of a computer which is required for displaying the total.

In this way, specialized knowledge is dispensed with and processing load of a computer can be alleviated and accordingly, the present invention can be utilized for a computer game by computer graphics, background (frame) of movie or the like, the present invention is applicable to analyzing a stress state of a machine or a structure and its simulation, further, the present invention can widely be utilized not only in physical properties but also in calculation and simulation display of tendency of displacement in a fluid and so on.

Further, by combining the display method for displaying load propagation displacement of a physical body according to the present invention with CG animation software, the display can be carried out in consideration of deformation of the physical body per se and accordingly, for example, tendency and shape of the muscle of a person can be displayed or when vehicle makes a turn at a curve, in consideration of force exerted to a tire, natural movement can be expressed similar to real picture (photographing by a video camera or the like).

The invention claimed is:

1. A calculation method for physical body deformation under load propagation which is a method of displaying a load propagation displacement of a physical body on a rigid physical body which undergoes a displacement constraint from a surrounding in a boundary which does not undergo the displacement constraint from the surrounding, said method comprising:

virtually forming a first material agent having a shape of a hexahedron or a plane in the physical body at a position of a load exerted to an arbitrary position of the physical body;

virtually forming a second material agent having the same shape as the first material agent at a contiguous face other than a face of the first material agent exerted with the load;

virtually forming a third, a fourth, up to an n-th material agent similarly as the first material agent and successively up to a boundary between the physical body and the boundary which does not undergo the displacement constraint in the physical body and/or the rigid physical body which undergoes the displacement constraint; and virtually forming boundary agents having predetermined shapes at a contact face between the physical body and the boundary which does not undergo the displacement constraint and/or the rigid physical body which undergoes the displacement constraint, wherein in the first to n-th material agents, (i) with regard to a direction of the load, a predetermined load in accordance with a material property thereof is transmitted to an upper face and a lower face of the physical body in the load direction, a predetermined load in accordance with a strain characteristic of the physical body is transmitted to a face orthogonal to the load direction, and a load which undergoes the predetermined displacement constraint is transmitted to an upper face in the load direction of one material agent contiguous to another material agent, (ii) with regard to the load, in the boundary agent formed in the boundary which does not undergo the displacement constraint, a load having a value the same as a value of the load from a contiguous material agent in the load direction is transmitted, and (iii) in the boundary agent formed in the rigid physical body which undergoes the displacement constraint, with regard to the load from the contiguous material agent, a load having a value the same as a value of the load is transmitted in a direction reverse to a direction of the load to thereby display the load propagation displacement of the physical body.

2. The display method according to claim 1, wherein the first through the n-th material agents are formed in a load propagation direction when the transmitted load is larger than a predetermined threshold value.

3. A computer readable record medium recorded with a program for displaying a load propagation displacement of a physical body by a method of displaying a load propagation displacement of a physical body on a rigid physical body which undergoes a displacement constraint from a surrounding in a boundary which does not undergo the displacement constraint from the surrounding by a computer screen, said method comprising:

virtually forming a first material agent having a shape of a hexahedron or a plane in the physical body at a position of a load exerted to an arbitrary position of the physical body;

virtually forming a second material agent having the same shape as the first material agent at a contiguous face other than a face of the first material agent exerted with the load;

virtually forming a third, a fourth, up to an n-th material agent similarly and successively up to a boundary between the physical body and the boundary which does not undergo the displacement constraint in the physical body and/or the rigid physical body which undergoes the displacement constraint; and virtually forming boundary agents having predetermined shapes at a contact face between the physical body and the boundary which does not undergo the displacement constraint and/or the rigid physical body which undergoes the displacement constraint, wherein in the material agents, (i) with regard to a direction of the load, a predetermined load in accordance with a material property thereof is transmitted to an upper face and a lower face of the physical body in the load direction, a predetermined load in accordance with a strain characteristic of the physical body is transmitted to a face orthogonal to the load direction, and a load which undergoes the predetermined displacement constraint is transmitted to an upper face in the load direction of one material agent contiguous to another material agent, (ii) with regard to the load, in the boundary agent formed in the boundary which does not undergo the displacement constraint, a load having a value the same as a value of the load from a contiguous material agent in the load direction is transmitted, and (iii) in the boundary agent formed in the rigid physical body which undergoes the displacement constraint, with regard to the load from the contiguous material agent, a load having a value the same as a value the load is transmitted in a direction reverse to a direction of the load to thereby display the load propagation displacement of the physical body.

4. The computer readable record medium recorded with the program according to claim 3, wherein the first through the n-th material agents are formed in a load propagation direction when the transmitted load is larger than a predetermined threshold value.

\* \* \* \* \*